May 24, 1960　　　　　　　　J. RUET　　　　　　　2,937,722
DISK BRAKES
Filed Sept. 11, 1956　　　　　　　　　　　　　　　3 Sheets-Sheet 1
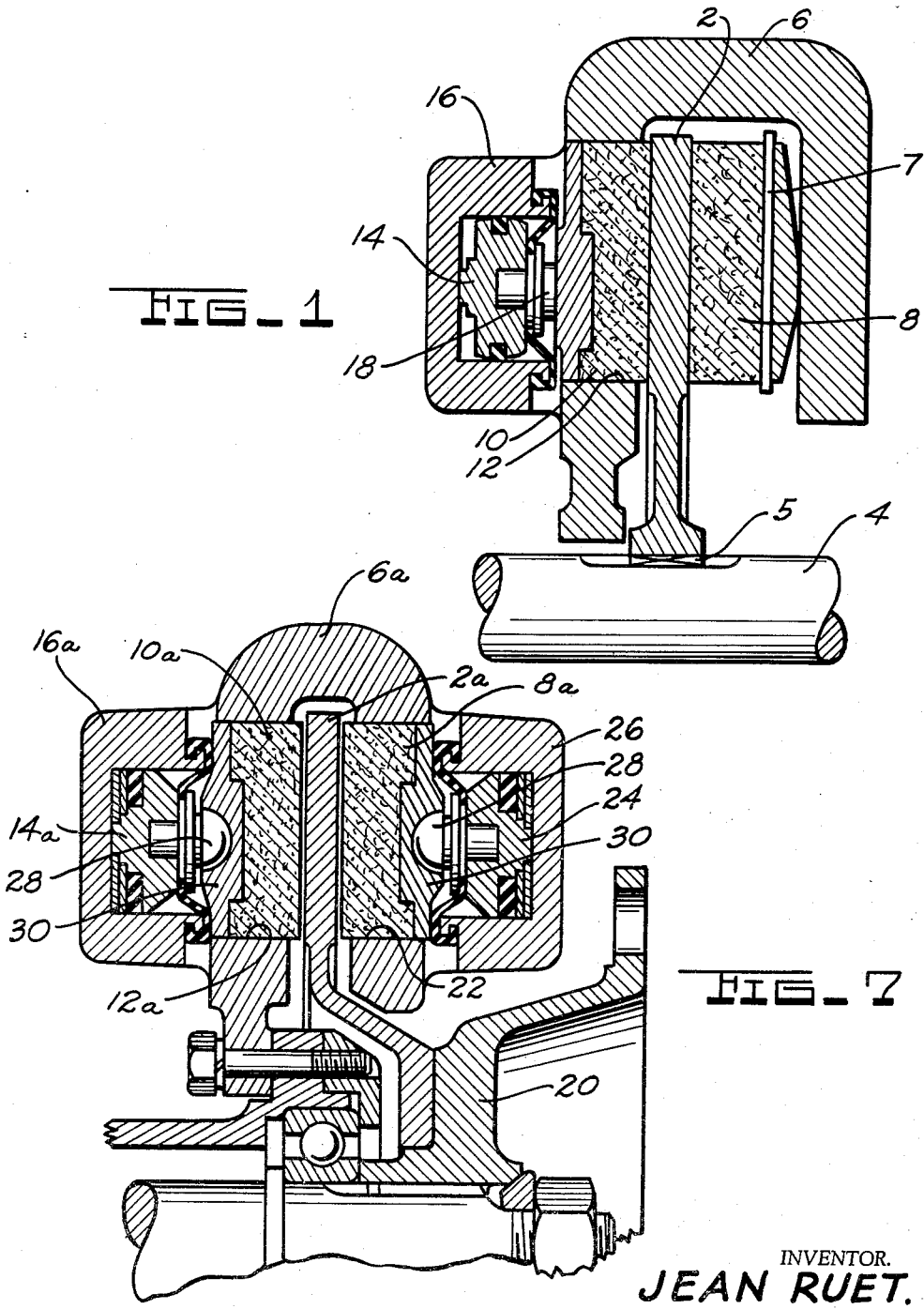
INVENTOR.
JEAN RUET.
BY
ATTORNEY.

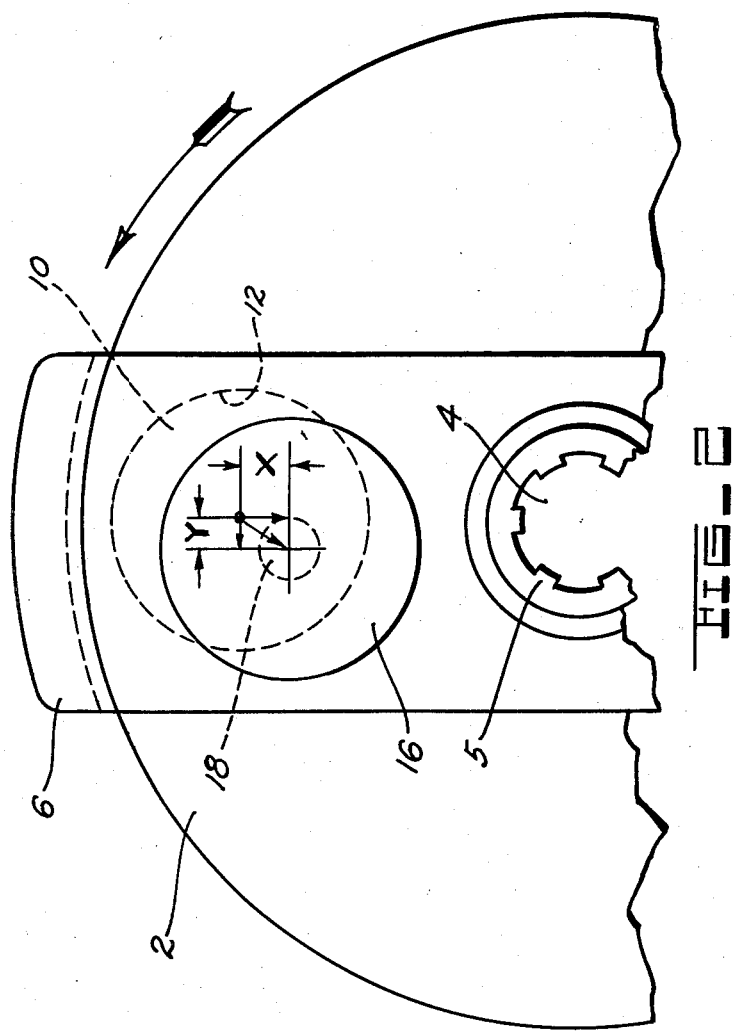

May 24, 1960 J. RUET 2,937,722
DISK BRAKES
Filed Sept. 11, 1956 3 Sheets-Sheet 3
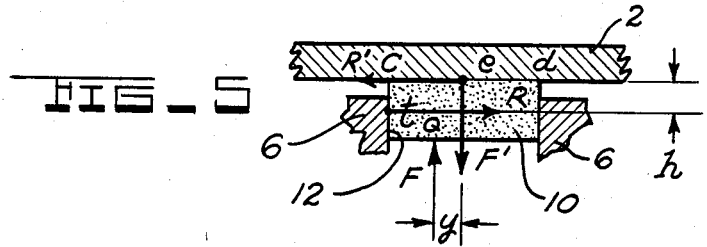
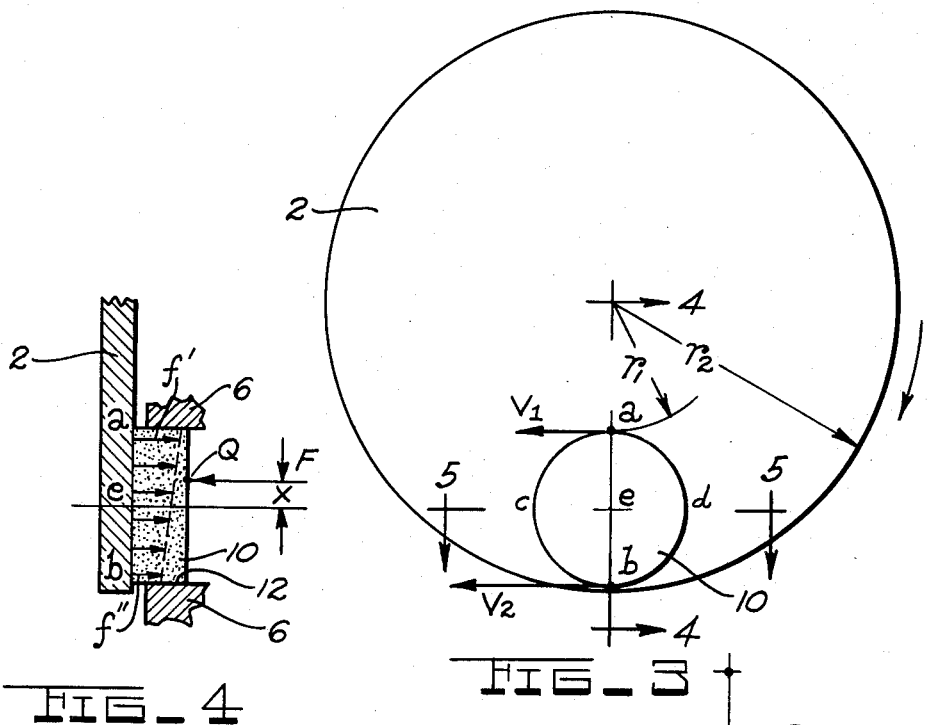
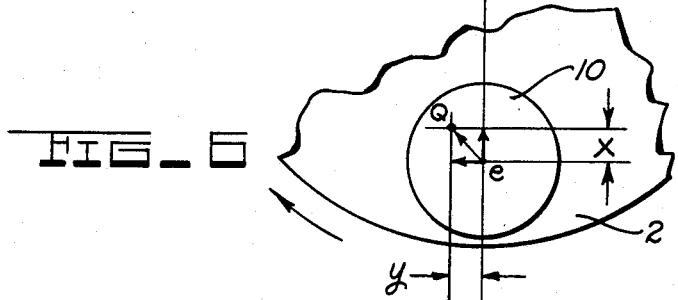
INVENTOR.
JEAN RUET.
BY John A. Young
ATTORNEY.

United States Patent Office 2,937,722
Patented May 24, 1960

2,937,722

DISK BRAKES

Jean Ruet, Limeil Brevannes, France, assignor to Bendix Aviation Corporation, South Bend, Ind., a corporation of Delaware Filed Sept. 11, 1956, Ser. No. 609,222

6 Claims. (Cl. 188—73)

The present invention relates to disk brakes of the "spot" type, in which a friction pad comes into engagement with the surface of a disk on a portion which is only a relatively small part of the circumference of the latter.

One of the problems which have been encountered in brakes of this type is unequal wear of the surface of contact of the friction pads. The linings have therefore to be replaced before they get completely worn out. Besides, the drawback of non-uniform wear of the friction pads from the viewpoint of a rational utilization of the friction lining, there are additional more important drawbacks which appear in brakes in which the friction pad is located in a recess which acts as a guide for the pad and acts as a support therefor in taking up the tangential reaction due to the friction of the lining on the disk. Indeed, due to unequal wear, the pads tilt in their recess and tend to take a position in which their friction surface is parallel to that of the disk under the action of the force exerted by the brake applying device, for instance a hydraulic cylinder piston. It results with the wedging of the pads in a position wherein they are in contact with the disk surface. The brake then remains in an applied position and the disk is subject to heating; it is necessary to dismount the brake in order to relieve the wedged pads.

An object of the present invention is to remedy the above described drawbacks by suppressing the causes of non-uniform wear of the friction pads.

Another object of the invention is to exert the application force on a friction pad at a point located in a manner to compensate for the effect of the differences of linear velocities to which the various elements of the lining are subjected.

A further object of the invention is to compensate for the tilting torque due to the tangential reaction generated by the friction of the brake lining on the surface of the rotor.

A still further object of the invention is to locate the applying point of the force at the extremity of a vector originating at the center of gravity of the brake lining surface and which is the geometrical sum of two vectors, the first of which is equal to the offset, in the direction of the lower velocities, i.e. towards the center of the disk, adapted to compensate the differences of linear velocities, and the second of which is equal to the offset, in the direction of rotation of the rotor, adapted to compensate the tilting torque.

The above and other objects of the present invention will appear more fully hereinafter from a consideration of the following description, taken in connection with the accompanying drawings, in which:

Figure 1 shows in section, a disk brake according to the invention;

Figure 2 represents a partial diagrammatic elevational view of the brake illustrated in Figure 1;

Figure 3 shows diagrammatically a brake in which the hydraulic cylinder is mounted at the lower part of the disk;

Figure 4 is a diagrammatic section taken along the line 4—4 of Figure 3;

Figure 5 is a diagrammatic section along the line 5—5 of Figure 3;

Figure 6 shows the position of the applying point of the effort according to the invention; and Figure 7 represents another type of disk brake embodying the device according to the invention.

The invention will be described with reference to pads of circular shape, but it must be understood that the same considerations and the same solutions can be applied to pads of another shape, especially those shaped as segments (more exactly: sectors of a ring). Moreover, the drawings represent brakes operated by hydraulic cylinders the effect of which is to move the friction pads in a manner to bring them into contact with the surface of the disk, but it is clear that the applying effort could be transmitted by a mechanical system of levers or any other device.

On Figures 1 and 2, a disk 2 is splined on a shaft 4, having splines 5 formed thereon. A stator 6 supports the parts of the brake on both sides of the disk. A fixed pad 8, which may be of circular shape, is mounted on the stator in any convenient manner; it is for instance operatively connected to a plate 7 fixed on a flange of the stator. A movable pad 10 is located in a recess 12. A piston 14, slidable in a hydraulic cylinder 16, can exert a pressure on pad 10 through the intermediary of a stud 18. The pad 10 is guided by the lateral walls of recess 12, said walls being also adapted to support the tangential reaction due to frictional engagement of pad 10 on the surface of the disk. It will be noted that, in accordance with the invention, the stud 18 is not located at the center of the pad 10.

The solution given by the invention will be best understood from a consideration of diagrammatic Figures 3 to 6.

It is recalled that the wear at a point of the surface of the lining is proportional to the pressure on this point and to the linear velocity on this point. On Figure 3, it is seen that point $a$ is submitted to a lower linear velocity than point $b$, since these velocities are proportional to the radii $r_1$ and $r_2$.

In order to compensate for the differences of linear velocities the pressure is not applied at the center of the pad, but at a point Q—indicated on Figure 4—offset by a quantity $x$ such that the pressure at $a$ is higher than at $b$. The local pressures at $a$ and $b$ being $p_1$ and $p_2$ respectively, the offset $x$ is determined in order to satisfy the relation:

$$p_1 r_1 = p_2 r_2$$

In this manner the wear at $a$ and $b$ will be identical, although the linear velocities of the disk at these points are different.

Figure 4 shows that to an application force F, spaced with relation to the center of the pad towards the axis of rotation of the disk, correspond reaction forces, the intensity of which has the maximum value $f'$ at point $a$ wherein the linear velocity is at its lowest, and gets lower and lower towards the periphery of the rotor till the minimum value $f''$ corresponding to point $b$ at which point the linear velocity is at its highest.

Points $c$ and $d$ (Figure 3) are submitted to substantially equal linear velocities, but a difference of pressure occurs between the region of point $c$ and that of point $d$, owing to the reaction of the supporting member exerted on the pad, which, results in an unequal wear at the leading edge $d$ and the trailing edge $c$ of the pad, unless this effect is compensated for according to one of the aspects of the invention. The cause of this difference in pressures is explained hereunder.

When pad 10 comes into engagement with the surface of disk 2, there appears a reaction force F' equal and oppositely directed to F, and the application point of which is at the center $e$ of the pad. As a consequence of the drag effect which is exerted on the pad due to the rotation of the disk, there appears a friction force R' tangent to the friction surface. The reaction force R equal and oppositely directed to R' appears at a point $t$ of the pad supporting member, i.e. the recess. Point $t$ is, in fact, distant from the disk surface by a quantity $h$; the result thereof is a tilting torque on the pad which gives rise to a difference in pressures between points $c$ and $d$.

In order to compensate for this torque which is due to friction reaction, the applying effort F is offset by a quantity $y$ with respect to the center of gravity, and in the direction of rotation of the disk, in order to satisfy the relation:

$$F.y = R.h$$

It will be noted that the ratio $R/F$ is equal to the coefficient of friction and that the offset $y$ is thus well defined.

In order to satisfy simultaneously both above conditions, the applying point Q of the effort is offset with respect to the geometrical center $e$ of the pad (Figure 6) by a distance which is the resultant of the two offsets $x$ and $y$ which are substantially perpendicular to each other. By applying the effort at point Q, the causes of unequal wear of the pad have therefore been removed.

It is to be noted that if the tilting torque is null or if compensation thereof is not desired, only the offset $x$ corresponding to the compensation of the difference in linear velocities comes into consideration.

The principle of the above described invention is applied to the brake shown in Figure 7, in which parts corresponding to those previously described will receive the same reference numeral followed by the subscript "$a$." The brake consists of a stator 6a and a disk 2a operatively connected with the hub 20 of a wheel. The lateral surfaces of disk 2a are adapted to cooperate with a pair of pads 8a and 10a facing the opposite sides of the rotor.

These pads are actuated by a pair of pistons 24, 14a each mounted in a cylinder 26 and 16a. Each piston is connected to the corresponding pad through the intermediary of a ball and socket joint 28 which fits into a spherical recess provided in a plate 30 which acts as a support-plate for the pad. As shown on Figure 7, the axis of the pistons is offset radially with respect to the axis of the pad by a quantity corresponding to the difference of the linear velocities exerted on the elements of the pad. In order to compensate the tilting torque it is advisable to offset the axis of ball-joints 28 as indicated in relation to the embodiment described above, and as diagrammatically shown on Figure 6.

The invention has been described with reference to a disk brake of the type for which a non-uniform wear of the friction lining would bring about the most serious drawbacks mentioned above. It is clear that the invention also applies to brakes in which friction pads might, without risks of wedging, effect a certain tilting with respect to their supporting member.

It is contemplated that other arrangements of elements than those shown in the accompanying drawings may be provided without departing from the scope of the present invention. Additional modifications of the present disk brake mechanism will occur to those skilled in the art.

I claim:

1. In a brake, a rotor having an engageable surface moving at non-uniform linear speed, a friction member movable into contact with the engageable surface of said rotor, applying means exerting laterally directed applying force on said friction member, and means for transmitting force from said applying means to said friction member, said transmitting means being radially inwardly displaced toward the axis of rotation of said rotor relatively to the geometrical center of said friction member to develop non-uniform applying pressure from the radially innermost to the radially outermost portion of said friction member which is inversely proportional to the relative speed between said rotor and friction member to thereby obtain more uniform wear of said friction member along the radial length of said friction member.

2. In a brake, a rotor having an engageable surface moving at non-uniform linear speed, a friction member which contacts the engageable surface of said rotor, applying means for exerting laterally directed applying force on said friction member, and means for transmitting force from said applying means to said friction member, said force-transmitting means being displaced radially inwardly from the geometrical center of said friction member in the direction of the axis of rotation of said rotor to develop applying pressure thereon inversely proportional to the relative speed between said friction member and its engageable surface of said rotor, said force-transmitting means being further displaced circumferentially in the direction of rotation of said rotor from the geometrical center of said friction member and effecting equalized lining wear from the leading to the trailing edges of said friction member to oppose turning of said friction member about one of the ends thereof toward the opposing rotor surface.

3. In a brake, a rotor, a housing, extending over a portion of said rotor, a fluid pressure operated cylinder provided in said housing, a piston located in the cylinder, a friction member adapted to be brought by said piston into engagement with said rotor, the axis of said cylinder being radially inwardly offset towards the axis of rotation of the rotor with respect to the center of gravity of said friction member to develop unequal applying force in a radial sense across the face of said friction member which is inversely proportional to the linear velocity between the frictional face of said friction member and its opposed surface of said rotor to compensate the difference of the linear velocities between the frictional face of said friction member and its opposed rotor surface, the axis of said cylinder being further displaced from the geometrical center of said friction member circumferentially in the direction of rotation of said rotor to balance turning force on said friction member and substantially equalize lining wear from the leading edge to the trailing edge thereof.

4. A brake according to claim 3 including a universal joint in the connection between the piston pad and the friction member.

5. A brake according to claim 3 including two oppositely acting fluid pressure actuated cylinders provided in said housing.

6. In a brake, a rotor, a friction member movable in contact with said rotor, an applying means operatively connected to said friction member, the applying point of the force transmitted by said applying means being located at the extremity of a vector originating from the center of gravity of said friction member and which is the geometrical sum of two vectors, the first of which is equal to the radially inward offset from the geometrical center of said friction member towards the center of the rotor to compensate the difference in linear velocities between the frictional face of said friction member and its opposed engageable surface of said rotor, and the second of which is equal to the offset circumferentially in the sense of rotation of the rotor to balance the lever arm between the friction force on the surface of said friction member upon engagement of the latter with the rotor and the line of action of the reaction force generated as a result of said engagement.

References Cited in the file of this patent

UNITED STATES PATENTS

| 2,679,303 | Wright et al. | May 25, 1954 |
| 2,754,936 | Butler | July 17, 1956 |

FOREIGN PATENTS

| 201,668 | Australia | Apr. 20, 1956 |
| 1,047,807 | France | Dec. 17, 1953 |
| 1,114,784 | France | Apr. 17, 1956 |